Sept. 25, 1923.
A. H. MORRIS
1,468,827
ADJUSTABLE TOOL HEAD
Original Filed Nov. 20, 1920
Fig.1.
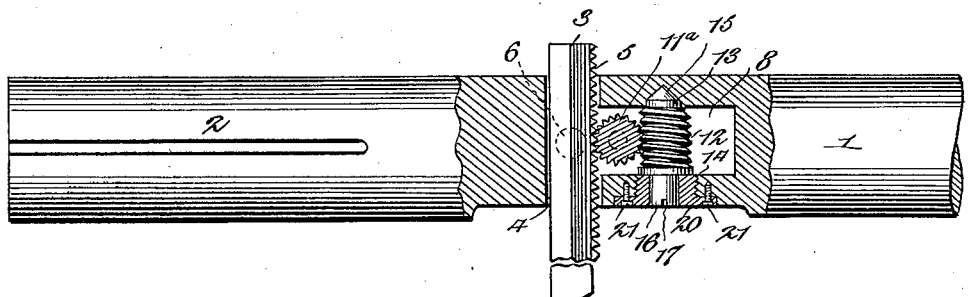
Fig.2.
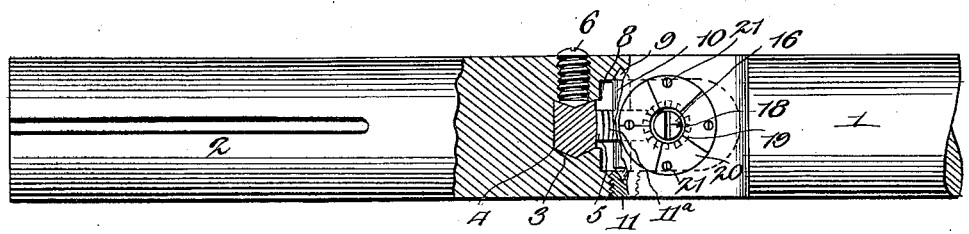
Fig.5.
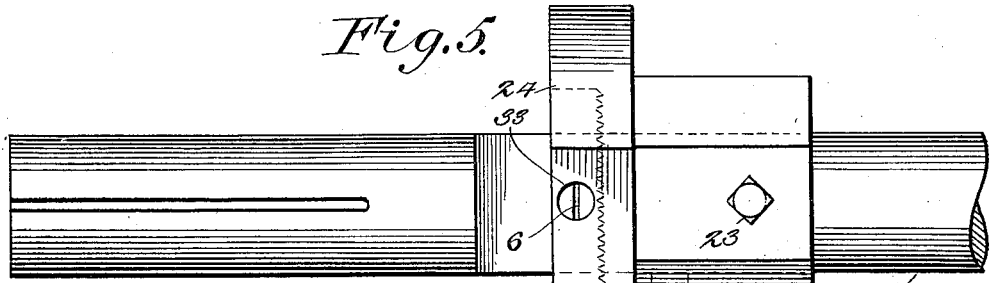
Fig.4.
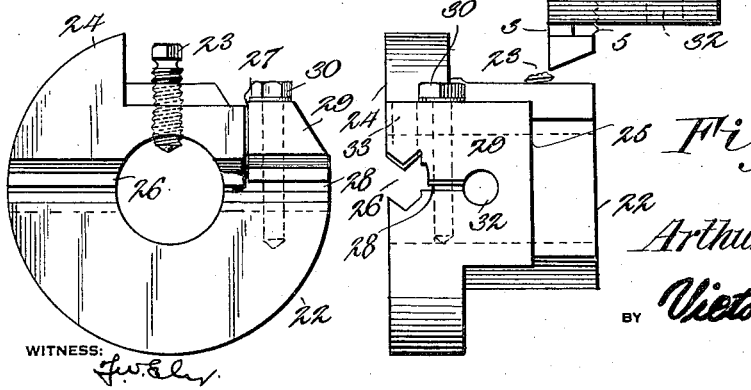
Fig.3.
Arthur H. Morris.
INVENTOR
BY Victor J. Evans
ATTORNEY
WITNESS:

Patented Sept. 25, 1923.

1,468,827

UNITED STATES PATENT OFFICE.

ARTHUR H. MORRIS, OF NEWARK, NEW JERSEY.

ADJUSTABLE TOOL HEAD.

Original application filed November 20, 1920, Serial No. 421,058. Divided and this application filed June 24, 1921. Serial No. 480,120.

*To all whom it may concern:*

Be it known that I, ARTHUR H. MORRIS, a citizen of the United States of America, residing at Newark, in the county of Essex and State of New Jersey, have invented new and useful Improvements in Adjustable Tool Heads, of which the following is a specification.

This invention relates to heads for adjustable boring tools and is a division of my pending application Serial No. 421,058; and the principal object is to provide mechanism of this nature which shall be simple of construction, cheap to manufacture, and highly efficient for the purpose intended.

Another object is to improve and simplify the boring head.

Other objects will appear as the specification proceeds, and the mechanism for accomplishing all of these objects is hereinafter fully described and claimed, and is shown in the accompanying drawing, in which:—

Figure 1 is a fragmentary horizontal sectional view of a boring bar provided with my improvement.

Figure 2 is a bottom view of the same partly in section.

Figure 3 is a side elevation of the boring head per se.

Figure 4 is a front elevation of the same.

Figure 5 is a top view showing the head and tool holder assembled.

Like characters of reference refer to like parts in all views.

While in the parent application are shown views with the tool both at an angle and straight, in the present application only the latter form is shown, as this is most readily adapted for use in a boring head.

Referring in detail to the drawing, 1 represents a boring bar which may have its free end extended to form a pilot 2. Mounted in this bar is the boring tool 3 which may be set at right angles to the longitudinal axis of the bar as shown. The bar 1 is provided with a slideway 4 in which the tool is seated, said slideway having two angular faces one forming a V-shaped depression or channel, and the other forming a corresponding V-shaped rib. The tool 3 is formed with a corresponding V-shaped rib and V-shaped channel to hold the tool firmly seated in the aperture or slideway 4. The tool 3 is also provided on one of its faces with threads 5, and a set screw 6 is threadedly mounted in the bar 1 and is provided at its inner end with a tapered portion 7 adapted to be forced into the V-shaped channel of the tool to hold it firmly in place when adjusted.

A cavity 8 opens out of the way 4 and is provided at one side with a tapered bearing 9, Figure 2, in which is seated the tapered end of a pin 10, the other end of which has its bearing in a conical depression in the inner end of a set screw 11 threadedly mounted in the bar 1. The pin 10 is formed at its middle portion into a worm gear 11$^a$ which meshes with the threads 5 on the tool 3.

The worm 11$^a$ also meshes with screw threads 12 on a member 13 which is mounted for free rotation in a hole 14 bored in bar 1 and communicating with cavity 8 and provided at its end with a tapered portion 15 in which the tapered end of member 13 is seated. The outer end of member 13 is provided with a shank 16 the exposed face of which has a slot 17 for the reception of the end of a screw driver, and has also an indicating arrow or pointer 18 which is adapted to register with indexes 19 on the outer face of a threaded sleeve 20 which screws into the bar 1 about the shank 16 so as to form the outer bearing of member 13 and also to hold 13 against longitudinal displacement. Set screws 21 hold the sleeve 20 against accidental displacement.

The operation of the mechanism is as follows:—

When the tool is to be adjusted, screw 6 is loosened, and then the member 13 is turned in the desired direction thereby rotating worm gear 11$^a$ and effecting sliding of the tool in its ways. The amount of adjustment may be accurately measured by the arrow 18 and indexes 19. Screw 6 is then tightened, and the device is ready for the cut.

The boring head is made up with the usual collar 22 and set screw 23 for securing the head in place on the bar 1 and a plate or disk 24 which is held on the collar 22 by coacting flat faces at 25. A way 26 is provided in the face of plate 24 for the receipt of the tool 3, said way being formed with an upper and lower V-shaped rib and channel, respectively. Slots 27 and 28 are cut into the plate 24 so as to define a lug 29 which is thus permitted a limited amount of movement, and a bolt 30 passes through this lug and into the lower portion of the plate 24 and when tightened, springs the lug down into clamping contact with the tool.

A hole 32 gives access to the head of the adjusting screw 13, and a hole 33 gives access to the head of screw 6.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed is:

1. The combination of a boring bar, a tool adjustably mounted transversely of said bar, adjusting means for effecting movement of said tool in said bar, and a head comprising a collar and a disk, means on said collar for attaching the boring head to said boring bar, a slideway in said disk for reception of said tool, an aperture in said disk for permitting access to said adjusting means, and a plurality of slots defining a lug adapted to be sprung into locking engagement with said tool.

2. The combination of a boring bar, a tool adjustably mounted transversely of said bar, adjusting means for effecting movement of said tool in said bar, and a head including a collar and a disk and adapted to be secured on said boring bar and to grip said tool, and provided with an aperture for permitting access to said adjusting means and with a plurality of slots defining a lug adapted to be sprung into locking engagement with said tool.

In testimony whereof I have affixed my signature.

ARTHUR H. MORRIS.